United States Patent Office 3,770,685
Patented Nov. 6, 1973

3,770,685
FUNCTIONAL SURFACE COATING COMPOSITIONS FOR CELLULOSIC MATERIAL
Melville W. Uffner, Media, and Dewey G. Holland, Allentown, Pa., assignors to Air Products and Chemicals, Inc., Allentown, Pa.
No Drawing. Continuation-in-part of abandoned application Ser. No. 885,290, Dec. 15, 1969. This application Jan. 24, 1972, Ser. No. 220,443
Int. Cl. C08f 29/22, 37/18; C08g 37/32
U.S. Cl. 260—29.4 UA
19 Claims

ABSTRACT OF THE DISCLOSURE

Functional surface coating compositions, prepared by blending a mixture of a fluorine-containing polymer and a non-fluorine containing material in aqueous medium, impart solvent, grease and oil resistance to cellulosic materials.

CROSS REFERENCE TO RELATED APPLICATIONS

This application is a continuation-in-part of application Ser. No. 885,290, filed Dec. 15, 1969, now abandoned.

BACKGROUND OF THE INVENTION

The present invention relates to the treatment of cellulosic material with a functional surface coating composition to render the cellulosic material solvent, oil and grease resistant. More particularly, the present invention relates to the use of a functional surface coating composition, prepared by blending a fluorine-containing polymer with a non-fluorine containing material in an aqueous medium, for imparting solvent, oil and grease repellency to cellulosic materials such as paper and paperboard.

Natural and synthetic polymers, especially those which are water soluble or are in latex form, are widely used in functional surface coatings to improve the substrate's appearance, printability and oleophobicity. Natural polymers include: starches, casein, modified cellulose, and soya protein. Synthetic polymers include: polyethylene, urea- and melamine-formaldehyde, polyacrylamide, polyvinyl acetate, ethylene-vinyl acetate, polyvinyl alcohol, polyvinyl chloride, acrylics, styrene-butadiene, acrylic butadiene, styrene-maleic anhydride, and polyvinylidene chloride. These natural and synthetic polymers are called converting chemicals. When they are applied to formed paper on the paper machines, they are "on-machine" coatings. When they are applied on a separate machine (for example in a converter's plant), they are "off-machine" coatings.

Only a few of the aforementioned converting chemicals provide resistance to oils, greases and solvents; for example: polyvinyl alcohol, polyvinylidene chloride, and casein. Polyvinyl alcohol is expensive; polyvinylidene chloride because of its crystallinity tends to fracture readily; and casein is subject to shortages in supply and price fluctuation. So, whereever possible, converters prefer to avoid the use of these chemicals.

The use of other converting chemicals such as latexes resulting from emulsion copolymerization of alkenyl aromatic monomers, such as styrene, and diolefins, such as butadiene, has been somewhat restricted due to the limitations which result from their lack of solvent and grease resistance, their poor adhesion to certain substrates, and their inability to air dry to an impermeable, tough, continuous coatings.

Fluorochemicals, in themselves, have been used to treat paper for improved oil, grease, and solvent repellency. Such treatment is expensive because of the high cost of the fluorochemicals. Moreover, in many instances the fluorochemical coatings do not meet the requirement for a continuous surface coating. In the past, fluorochemicals have been added in small amounts to polyvinyl alcohol and to carboxymethyl cellulose to upgrade or increase the solvent, grease and oil repellency of these polymers but little or no success has been obtained with the addition of commercially available fluorochemicals to low cost, converting chemicals such as styrene-butadiene, starch, and vinyl acetate homopolymers and copolymers, or to higher priced converting chemicals such as polyvinylidene chloride.

It has now been discovered that certain converting chemicals can be modified by the addition of minute amounts of new fluorine-containing polymers to produce functional surface coating compositions which provide outstanding solvent, oil and grease barrier characteristics when applied to cellulosic materials, such as paper and paperboard. Further, such functional surface coating compositions provide grease, solvent, and oil resistance to creased paper and to scored paperboard-resistance either not provided with previously existent fluorochemicals or not provided with previously existent fluorochemicals at an economical cost.

SUMMARY OF THE INVENTION

It is an object of the present invention to render cellulosic materials solvent, grease and oil repellent.

Another object of this invention is to provide functional surface coating compositions for treating cellulosic material.

Still another object of this invention is to provide a process for imparting solvent, oil and grease resistance to cellulosic materials by treating said materials with functional surface coating compositions prepared by blending a fluorine-containing polymer and a non-fluorine containing material in an aqueous medium.

In accordance with the present invention, functional surface coating compositions are prepared by mixing 0.05 to 10 percent by weight of an active fluorine-containing polymer with 90 to 99.95 percent by weight of a non-fluorine containing material and the resulting compositions are used to impart solvent, grease and oil resistance to cellulosic materials such as paper, cardboard, paperboard, etc. The non-fluorine containing material employed herein is carboxylated styrene-butadiene, hydroxyethylated starch, polyvinylidene chloride, or a vinyl acetate copolymer. For the present invention, carboxylated styrene-butadiene copolymers comprise standard, commercially available products of styrene-butadiene having sufficient carboxyl groups derived from organic acids to hydrogen bond to cellulose substrates and/or to be cross-linked and insolubilized by cross-linking agents, such as by aminoplast resins. The extent of carboxylation of the latex should not be so great so as to exceed the amount which upon appjlication to a substrate material would render it lipophilic. Generally, carboxylation of styrene-butadiene copolymers will approximately range from about 0.1% to about 12% by weight based upon the weight of the latex, however, most preferably carboxylation will be from about 0.2 to about 5.0% by weight.

The active fluorine-containing polymers which can be used in the present invention include homopolymers and copolymers of fluorocarbon acrylic monomers which have 2 to 18 carbon atoms in the alkyl, isoalkyl or cycloalkyl group and at least one perfluoroalkyl or two perfluoroalkylene groups. Examples of such acrylic monomers include those compounds having (1) a perfluoroalkyl, omega-hydroperfluoroalkyl, substituted and unsubstituted perfluorocycloalkyl, perfluoroisoalkyl or alpha-hydroperfluoroisoalkyl group at one end and (2) a polymerizable acrylic or methacrylic ester group at the other end. The two groups may be connected by a divalent composite linking group. Where such linking groups are present, they consist of at least one divalent radical selected from the group consisting of alkylene groups having 1 to 12 carbon atoms, unalkylated carbonamido, N-alkyl-carbonamido, unalkylated sulfonamido, and N-alkyl-sulfonamido, wherein at least one of said radicals is alkylene and not more than one of said radicals its carbonamido or sulfonamido.

The above-describd fluorocarbon acrylic monomers may be reacted with an alpha,beta-ethylenically unsaturated carboxylic acid comonomer to provide a fluorochemical containing copolymer. Such comonomers have the structure:

$$CHR_5=C(R_6)COOH,$$

where $R_5$ is H, $CH_3$, $C_6H_5$, or COOH and $R_6$ is H, $CH_3$, or $CH_2COOH$.

After being applied to the desired cellulosic substrate, the functional surface coating compositions used in the present invention are dried at a temperature from 23° C. to 205° C. for between 24 hours and 5 seconds. It has been discovered that the presence of as low as 0.05% active fluorochemical in the functional surface coating composition provides an effective oil, solvent, and grease resistant barrier and that it is generally not necessary to use more than 10% active fluorochemical. Nevertheless, higher and lower percentages of fluorochemical can be employed—the upper limit being determined largely by economic considerations and the degree of solvent, oil and grease resistance required.

It has additionally been discovered that an unexpected improvement is obtained when aminoplast resins are added to the functional surface coating compositions of the present invention. As mentioned above, aminoplasts are useful in the present coating compositions as cross-linking agents acting to insolubilize the non-fluorine containing material. Aminoplasts denote those resins made by the polycondensation of formaldehyde with a nitrogen compound and a higher aliphatic alcohol and includes the urea-formaldehyde type resins as well as the triazine-formaldehyde types prepared from melamine or benzoguanamine. Generally, only a minor or cross-linking amount of aminoplast resin is all that is required. Cross-linking agents are ordinarily added in a sufficient amount to the basic coating composition which comprises active fluorine-containing polymer and non-fluorine containing material. More specifically, cross-linking aminoplasts are used in the composition in an amount ranging from about 1% to about 50% on 100 parts by weight of basic coating composition, and more preferably from about 5% to about 25% on 100 parts by weight of said composition.

DESCRIPTION OF THE PREFERRED EMBODIMENT

As indicated above, the functional surface coating compositions of the present invention are prepared by mixing between 0.05 and 10 percent by wight of an active fluorine-containing polymer with between 90 and 99.95 percent by weight of a non-fluorine containing material.

The following monomers are representative of the fluorocarbon acrylic monomers which may be employed in the preparation of the active fluorine-containing polymer:

$CH_2=C(CH_3)COOCH_2(c-C_6F_{11})$*
$CH_2=C(CH_3)COOCH_2(CF)_7F$*
$CH_2=C(CH_3)COOCF(CF_3)_2$
$CH_2=C(CH_3)COOCH_2(CF_2)_4H$
$CH_2=CHCOOCH_2(CF_2)_6H$
$CH_2=C(CH_3)COOCH_2CH_2(CF_2)_8F$
$CH_2=C(CH_3)COO(CF_2)_5CF(CF_3)_2$
$CH_2=CHOOCH_2CF_2H$
$CH_2=C(CH_3)COOCH_2(c-C_6F_{10})CF_3$*
$CH_2=CHCOOCH_2CH_2N(CH_3)O_2S(CF_2)_4F$

*c- designates an alicyclic structure.

Such fluorocarbon acrylic monomers may be homopolymerized or copolymerized with an alpha,beta-ethylenically unsaturated carboxylic acid comonomer. The following monomers are representative of said carboxylic acid comonomers:

acrylic acid
methacrylic acid
itaconic acid
maleic acid
fumaric acid
crotonic acid
cinnamic acid The non-fluorine containing material which is mixed with the fluorine-containing polymer in order to obtain the functional surface coating compositions of the present invention consists of carboxylated styrene-butadiene, hydroxyethylated starch, polyvinylidene chloride or vinyl acetate copolymer.

Monomers which can be copolymerized with vinyl acetate to form the vinyl acetate copolymers include such monomers as ethylene, propylene, vinyl chloride, maleic acid, itaconic acid, dibutyl maleate, etc. The non-fluorine containing material can be prepared by well-known procedures for polymerization by aqueous or solution techniques. In accordance with such procedures the monomers are dispersed, for example, in an aqueous solution of from about 0.05 to 5 percent of a polymerization catalyst, such as potassium persulfate, and from about 0.05 to 5 percent of a pH stable surface-active agent capable of emulsifying the monomers. Polymerization is initiated by heating the emulsified mixture, usually between 30 and 70° C., and is continued by maintaining the polymerizerd emulsion at the selected temperature. After the polymerization has reached the desired conversion of monomer to polymer, the latex is filtered to remove any precoagulum and may be stabilized to storage by the addition of a small amount of known stabilizer.

For practical reasons polymeric solids are important. Latexes having less than about 20 percent by weight of polymeric solids are uneconomical to prepare, to store and to ship. When the latex has appreciably more than about 50 percent by weight of polymeric solids, it is usually sensitive to storage and to mechanical shear and may be coagulated prematurely. The coating thickness is easily controlled by the polymer solids of the latex. For optimum film-forming characteristics it is desirable that the majority of the particles have individual diameters of from about 500 to 2500 angstrom units. When the majority of the particles are outside of the expressed range, the latex will be less stable to storage and mechanical working and will have less film-forming ability than a latex having particles within the expressed range.

For various coating applications, it is desirable to have certain additives incorporated with the functional surface coating compositions. Typical examples of such additives commonly used in the art of paper coating are colors, organic and inorganic pigments, stabilizers, fillers, defoamers and natural binders. These additives are intermixed with the functional surface coating compositions of this invention by conventional blending methods. Thus, the additive may be finely comminuted and stirred into the functional surface coating compositions or an aqueous dispersion of the additive may be blended with the functional surface coating compositions.

For coating paper it is frequently desirable to incorporate a minor amount of natural binders such as casein and starch to achieve certain coating properties. Such natural binders may constitute from about 10 to 25 percent by weight of the combined material.

It is an inherent advantage of the functional surface coating compositions of the present invention that there is improved bonding of the film-forming constituents to solid additives, such as the pigments and fillers. This results in more uniform and permanent coloring and filling with less likelihood of bleaching of the colorant or filler.

The functional surface coating compositions are well adapted for application to paper and other similar materials. These compositions can be applied by any one of several means, e.g., roller, brush, size press, air knife or other known coating methods. The resultant thin coatings are adequate for most applications. If slightly thicker coatings are desired, the functional surface coating compositions may be thickened with a small amount of a hydrophobic colloid, such as the cellulose ethers.

The functional surface coating compositions of this invention are air dryable to a useful continuous coating. It should be understood, however, that the functional surface coating compositions of the present invention may be baked if desired.

The coated papers resulting from the application of these functional surface coating compositions exhibit excellent solvent resistance. Although the coatings may change from clear to opaque when wet, there is no loss of protection. The coatings are clear in unmodified state and may be colored with pigments or dyes. The coatings exhibit good adhesion to paper and to solid additives. They also have a high gloss and may be printed in a conventional manner.

The functional surface coating compositions are especially advantageous because of the following characteristics:

(1) Solvent holdout of dopes applied to electrostatic and carbon papers, thereby preventing strike-in of the dope.
(2) "Fugitive" holdout (short term holdout: seconds or a fraction of a second) of solvent and oil-based printing inks.
(3) Wax holdouts (keeps wax on surface).
(4) Asphalt holdout (prevents bleeding on shrouding papers and tapes).

The following method is employed for applying and testing the functional surface coating compositions of the present invention. The fluorochemical, containing polymer in aqueous medium, is added to the non-fluorine containing material, which is in the form of an aqueous solution, emulsion or dispersion, under propeller blade agitation. A clay slurry, defoamer, color, or other ingredient may be added at any stage of the addition. The pH of the system may be adjusted to from 4 to 11 without loss of the inherent properties of the fluorochemical. Ammonium hydroxide is the preferred neutralizing agent. Optimum pH adjustment is governed by the stability range of the polymer latex and regard to protecting the paper from "tenderizing."

For test purposes, the functional surface coating composition is coated on paper or paperboard by means of a wire wound rod, commonly employed in paper coating laboratories. The coated paper is dried for 10 minutes at 83° C. in a circulating forced draft oven, and stored for 72 hours at 23° C. and 50% relative humidity prior to testing.

Coating weights are determined by the difference in weight between the dry uncoated paper (of known surface area) and the dried coated paper. Coating weights are adjusted to read in pounds per ream; a ream of paper being 3,000 square feet and a ream of paperboard being 1,000 square feet.

The following test kit, comprising a series of alkanes ranging in surface tension from 20 to 31 dynes/cm., is used to determine solvent resistance. The series and the "coalescence" test ratings applicable to each alkane are shown below:

| | Coalescence value |
|---|---|
| Nujol | 31 |
| 75/25 Nujol/n-hexadecane | 30 |
| 50/50 Nujol/n-hexadecane | 29 |
| n-Tetradecane | 27 |
| n-Dodecane | 25 |
| n-Decane | 24 |
| n-Octane | 22 |
| n-Heptane | 20 |

The coalescence value is an indirect measure of the wetting and spreading which the test liquid makes with the sized surface. Two drops of each liquid in the test kit are placed on 3/8" centers on the sized surface. These drops head on a solvent resistant surface. The surface tension of that liquid of lowest surface tension, two drops of which will not spread and coalesce within one minute, determines the rating. The lower the number the higher the solvent resistance.

In accordance with another test, an accelerated comparison of the relative rates at which oils or greases, such as commonly found in foodstuffs may be expected to penetrate papers such as uncoated or unimpregnated grease-proof, glassine and vegetable parchment is obtained by using apparatus which includes:

(1) A tube of any rigid material, 2.5 cm. (1 in.) inside diameter (ID) and at least 2.5 cm. (1 in.) in height, the ends of which have been smoothed.
(2) A pipet or medicine dropper, calibrated to deliver 1.1 ml.
(3) Round-grained sand, Ottawa cement testing sand screened to pass a No. 20 and be retained on a No. 30 sieve.
(4) Sheets of white coated and calendered book paper, 104 g./m.$^2$, 70 lb. at least the same size as the test specimen, preferably much larger.
(5) A stopwatch or laboratory timer.

Reagents, i.e., peanut oil, Nujol, liquid lard, and corn oil, are separately placed in bottles (100 ml. in each bottle with 1.0 grams of an oil soluble red dye. Each specimen is then placed on a sheet of the book paper resting on a smooth flat surface. An end of the tube is placed on the specimen and 5 grams of sand are placed in the tube. The purpose of the tube is solely to ensure a uniform area of the sand pile and the tube is removed immediately after the addition of the sand. Using the pipet or medicine dropper, 1.1 ml. of the colored oil or grease is added to the sand, and the timing device is started. Three conditions of folds exist for the specimen, namely:

(A) No fold
(B) Creased into
(C) Creased away

The test proceeds for 72 hours at 60° C. or until the stain strikes through the treated paper and stains the book paper beneath it.

The invention will be illustrated by the following specific examples, it being understood that there is no intention to be necessarily limited by any details thereof since variations can be made within the scope of the invention. Parts or percent mentioned in these examples are based on total weight solids.

Example I

A 15% solids aqueous solution of hydroxyethylated (HE) starch (Penick & Ford's Essex Gum 1360) was prepared by heating and stirring 1/2 hour at 83° C. This stock solution was divided into three equal portions. One portion was retained as the control. To 100 active parts by weight (p.b.w.) of the second portion 1 active p.b.w. of poly-(undecafluorocyclohexane carbinol acrylate) (CAP), as a 20% solids latex, was added and the total blended by stirring. Similarly, the third portion was prepared as the second except that 15 p.b.w. of urea-formaldehyde (UF) resin (Virgina Chemical's Virset A–125) was added additionally. The control and the compositions were then applied by means of a wire wound rod on supercalendered 40 pounds/ream Kraft paper to yield a coating weight of 1 to 3 lbs./ream after drying 10 minutes at 83° C.

The coatings, after aging 72 hours at 23° C. and 50% relative humidity were subjected to the "coalescence" test. The ratings follow:

| | Coalescence value |
|---|---|
| HE Starch (100 p.b.w.) | 31 |
| HE Starch (100 p.b.w.)/CAP (1 p.b.w.) | 24 |
| He Starch (100 p.b.w.)/CAP (1 p.b.w.)/UF (15 p.b.w.) | 22 |

The lower ratings indicate that the solvent resistance of the coating is greater in the presence of fluorochemical.

Example II

To identical portions of 100 active p.b.w. of vinyl acetate (PVA) copolymer latex (National Starch & Chemical's Resin 1103), 0.1 active p.b.w. and 1.0 p.b.w., respectively, of CAP were added and tested as in Example I. The results were as follows:

| | Coalescence value |
|---|---|
| PVA copolymer (100 p.b.w.) | 31 |
| PVA copolymer (100 p.b.w.)/CAP (0.1 p.b.w.) | 20 |
| PVA copolymer (100 p.b.w.)/CAP (1.0 p.b.w.) | 20–22 |

The lower ratings indicate that the solvent resistance of the coating is greater in the presence of fluorochemical.

Example III

Functional surface coating compositions were prepared by blending a mixture of a carboxylated butadiene-styrene copolymer latex, prapared by emulsion polymerization at 50° C. of 55 percent by weight of butadiene, 40 percent by weight styrene and 5 percent by weight of acrylic acid, with varying proportions of poly-(undecafluorocyclohexane carbinol methacrylate). When the functional surface coating compositions contained 5 percent of the fluorine containing homopolymer latex solids there was no penetration observed during a two-hour test period with Nujol 3-in-1 oil, gun oil and corn oil, applied at a total coating solids weight of 14 pounds/ream to 40 pounds/ream unbleached kraft paper.

In contrast, when the carboxylated butadiene-styrene copolymer alone was applied at 14 pounds/ream to 40 pounds/ream unbleached kraft paper, immediate penetration occurred with each of the four oils employed in the identical testing procedure.

Similar characteristics were obtained when itaconic, maleic, fumaric, and cinnamic acids were substituted for the acrylic acid in the carboxylated butadiene-styrene copolymer.

Example IV

To identical portions of 100 active p.b.w. of two grades CBS 1 and CBS 2, respectively, of carboxylated styrene-butadiene latices (Standard Brands' Tylac 4001 and Tylac PCX) 0.1 and 0.2 active p.b.w. of CAP were added and applied at 6 to 8 pounds/ream to a 26 pound coating base stock (with a furnish composed of groundwood, sulfite and kraft pulps).

Results of TAPPI T507su–68 test for oil resistance and grease resistance follow:

| | Peanut oil holdout of creased specimen at 60° C., hours (avg.) |
|---|---|
| CSB 1 (100 p.b.w.) | 0.88 |
| CSB 2 (100 p.b.w.) | 4.0 |
| CSB 1 (100 p.b.w.)/CAP (0.1 p.b.w.) | 1.67 |
| CSB 2 (100 p.b.w.)/CAP (0.2 p.b.w.) | 7.0 |

The results clearly indicate the improved oil resistance of CBS coatings containing CAP fluorochemical.

Example V

To 100 active p.b.w. of CBS (Dow Latex 620) 0.5 active p.b.w. of CAP was added. Similarly, to 100 active p.b.w. of Dow Latex 620, 0.5 active p.b.w. of the copolymer latex undecafluorocyclohexane carbinol acrylate/methacrylic acid (CA–MAA) in the weight ratio of 90/10 was added.

These functional surface coating compositions were coated on 50 pounds/ream Southern Kraft and tested as in Example IV with the following results:

| | Peanut oil holdout of creased specimen at 60° C., hours (avg.) |
|---|---|
| CSB (100 p.b.w.) | 1.4 |
| CSB (100 p.b.w.)/CA–MAA (0.5 p.b.w.) | 2.0 |
| CSB (100 p.b.w.)/CAP (0.5 p.b.w.) | 2.5 |

These results show the improved oil resistance of CSB coatings containing either one of the following fluorochemicals: CA–MAA and CAP.

Example VI

To 100 active p.b.w. of CSB (Dow Latex 636) the following fluorochemical was respectively added as indicated below:

1 p.b.w. CAP

That composition containing CAP was applied as in Example II, but at 12 to 16 pounds/ream, to both machine finished (MF) and machine glazed (MG) paper of 40 pounds/ream basis weight.

Results of TAPPI T507su–68 test follow:

| Paper | Coating | Flat peanut oil, holdout at 60° C., hours (avg.) |
|---|---|---|
| MF | CSB (100 p.b.w.) | 6.0 |
| MF | CSB (100 p.b.w.)/CAP (1 p.b.w.) | 12.0 |
| MG | CSB (100 p.b.w.) | 8.0 |
| MG | CSB (100 p.b.w.)/CAP (1 p.b.w.) | 12.7 |

The results demonstrate the improved oleophobicity of CSB latex coatings containing CAP. The effect is apparent on both machine finished and machine glazed paper.

Example VII

A functional surface coating composition was prepared by blending a mixture of 5 percent by weight of poly-(pentadecafluoroheptyl) carbinol acrylate and 95 percent by weight of a carboxylated butadiene-styrene copolymer latex, prepared in accordance with Example III. When this fluoropolymer latice was applied to unbleached Kraft paper, no penetration occurred during the two-hour test period with Nujol 3-in-1 oil or corn oil.

Example VIII 70 lb. clay coated paperboard, commonly used in food packaging, was coated on board side with a typical grease resistant composition.

| | Coating weight, lbs./ream |
|---|---|
| Ethylene-vinyl acetate copolymer | 2 |
| Polyvinylidene chloride | 2.5 |

The ethylene-vinyl acetate (Et-VAc) is applied as a primer in a single coat, while the polyvinylidene chloride (PVDC) is normally applied as a double coat over the primer, to insure a pin-hole free surface. The Et-VAc used was Airco's Aircoflex 100 HS. The PVDC used was Dewey & Almy's Daran 212.

The coatings were subjected to three tests:

(a) flat turpentine holdout
(b) flat peanut oil holdout
(c) scored peanut oil holdout The coating adhesive shown above stained deeply after 10 minutes contact with a drop of turpentine. The flat coating held out dyed peanut oil for 1 hour, but peanut oil penetrated the score line immediately.

The addition of 0.5 active p.b.w. of CAP to 100 active p.b.w. of PVDC and the application of coating as above yielded a surface which was resistant to turpentine in that a drop of dyed turpentine only negligibly stained the surface after 10 minutes contact time. The coated flat board was also resistant to dyed peanut oil, but more remarkable the scored coated board resisted penetration of dyed peanut oil for more than 1 hour.

Quite unexpectedly, the addition of 0.1 p.b.w. active CAP to 100 active p.b.w. of primer and 0.1 p.b.w. of active CAP to 100 active p.b.w. of PVDC, precluded the need for a double-pass PVDC coat. That is to say, a 2 lb./ream primer coat followed by a single 1.6 lb./ream PVDC coat, each coat containing 0.1% CAP, resulted in a finished board which resisted the penetration of dyed peanut oil at the score line for more than 1 hour.

And again, quite unexpectedly, when 0.1 p.b.w. active perfluorocyclohexyl carbinol acrylate/acrylic acid (CA/AA), in 80/20 weight ratio was added as a 20% solids latex to 100 p.b.w. active Et/VAc and applied as a single 2 lb./ream coat, followed by a double-pass 2.5 lb./ream PVDC coat, the resultant coating not only withstood penetration of peanut oil on the flat board, but also on the score line.

Example IX

Functional surface coating compositions were prepared by blending a fluorine-containing copolymer latex, consisting of 80 parts by weight of heptafluoropropyl carbinol acrylate and 20 parts by weight of acrylic acid, with Dow Latex 636, carboxylated styrene-butadiene latex.

The peanut oil holdout (creased) of the resulting fluoropolymer latice coating applied at 6 to 8 pounds per 3,000 square feet to 50 pound kraft paper and tested at 60° C. is shown in the following table:

| Fluoropolymer latice (parts per weight) | | |
|---|---|---|
| Non-fluorine containing material | Fluorine containing copolymer latex | Maximum holdout time (hours) |
| 100 | 0.1 | 3.5 |
| 100 | 0.5 | 4.0 |
| 100 | 1.0 | 5.0 |

The maximum peanut oil holdout time for the non-fluorine containing material alone was 0.75 hour.

The turpentine holdout (flat) of the same fluoropolymer latice applied to the kraft paper at 24° C. is shown in the following table:

| Fluoropolymer latice (parts per weight) | | |
|---|---|---|
| Non-fluorine containing material | Fluorine containing copolymer latex | Maximum holdout time (hours) |
| 100 | 0.1 | 113 |
| 100 | 0.5 | 166 |
| 100 | 1.0 | 211 |

The maximum turpentine holdout time for the non-fluorine containing material alone was 99 seconds.

Thus, with as little as 0.1 p.b.w. of the fluorine-containing copolymer latex the resistance of the fluoropolymer latice to grease is substantially improved.

Example X

Functional surface coating compositions were prepared by blending a fluorine-containing copolymer latex, consisting of 90 parts by weight of undecafluorocyclohexane carbinol methylacrylate and 10 parts by weight of methacrylic acid, with Dow Latex 636, carboxylated styrene-butadiene latex.

The peanut oil holdout (creased) of the resulting fluoropolymer latice coating applied at 6 to 8 pounds per 3,000 square feet to 50 pound kraft paper and tested at 60° C. is shown in the following table:

| Fluoropolymer latice (parts per weight) | | |
|---|---|---|
| Non-fluorine containing material | Fluorine containing copolymer latex | Maximum holdout time (hours) |
| 100 | 0.1 | 0.4 |
| 100 | 0.5 | 3.0 |
| 100 | 1.0 | 5.0 |

The maximum peanut oil holdout time for the non-fluorine containing material alone was 0.75 hour.

The turpentine holdout (flat) of the same fluoropolymer latice applied to the kraft paper at 23° C. is shown in the following table:

| Fluoropolymer latice (parts per weight) | | |
|---|---|---|
| Non-fluorine containing material | Fluorine containing copolymer latex | Maximum holdout time (hours) |
| 100 | 0.1 | 125 |
| 100 | 0.5 | 222 |
| 100 | 1.0 | 209 |

The maximum turpentine holdout time for the non-fluorine containing material alone was 99 seconds.

Thus, with as little as 0.1 p.b.w. of the fluorine-containing copolymer latex the resistance of the fluoropolymer latice to grease is substantially improved.

Example XI

Functional surface coating compositions were prepared by blending a fluorine containing polymer latex, consisting of poly(undecafluorocyclohexane carbinol methacrylate) with Dow Latex 636 carboxylated styrene-butadiene latex.

The peanut oil holdout (creased) of the resulting fluoro polymer latice coating applied at 6 to 8 pounds per 3,000 square feet to 50 pound kraft paper and tested at 60° C. is shown in the following table:

| Fluoropolymer latice (parts per weight) | | |
|---|---|---|
| Non-fluorine containing material | Fluorine containing copolymer latex | Maximum holdout time (hours) |
| 100 | 0.1 | 4.0 |
| 100 | 0.5 | 3.5 |
| 100 | 1.0 | 2.5 |

The maximum peanut oil holdout time for the non-fluorine containing material alone was 0.75 hour.

The turpentine holdout (flat) of the same fluoropolymer latice applied to the kraft paper at 23° C. is shown in the following table:

| Fluoropolymer latice (parts per weight) | | |
|---|---|---|
| Non-fluorine containing material | Fluorine containing copolymer latex | Maximum holdout time (seconds) |
| 100 | 0.1 | 116 |
| 100 | 0.5 | 139 |
| 100 | 1.0 | 197 |

The maximum turpentine holdout time for the non-fluorine containing material alone was 99 seconds.

Thus, with as little as 0.1 p.h.w. of the fluorine containing polymer latex the resistance of the fluoropolymer latice to grease is substantially improved.

Example XII

Functional surface coating compositions were prepared by blending a fluorine containing copolymer latex, consisting of 80 parts by weight of heptafluoropropyl carbinol acrylate and 20 parts by weight of acrylic acid, with Dow Latex 620, carboxylated styrene-butadiene latex.

The peanut oil holdout (creased) of the resulting fluoropolymer latice coating applied at 6 to 8 pounds per 3,000 square feet to 50 pound kraft paper and tested at 60° C. is shown in the following table:

| Fluoropolymer latice (parts per weight) | | |
|---|---|---|
| Non-fluorine containing material | Fluorine containing copolymer latex | Maximum holdout time (hours) |
| 100 | 0.05 | 4.5 |
| 100 | 0.5 | 5.8 |

The maximum peanut oil holdout time for the non-fluorine containing material alone was 2.0 hours.

Thus, with as little as 0.05 p.b.w. of the fluorine containing copolymer latex the resistance of the fluoropolymer latice to grease is substantially improved.

Example XIII

Functional surface coating compositions were prepared by blending a fluorine containing copolymer latex, consisting of 95 parts by weight of undecafluorocyclohexane carbinol methacrylate and 5 parts by weight of methacrylic acid, with Dow Latex 620, carboxylated styrene-butadiene latex.

The peanut oil holdout (creased) of the resulting fluoropolymer latice coating applied at 6 to 8 pounds per 3,000 square feet to 50 pounds kraft paper and tested at 60° C. is shown in the following table:

| Fluoropolymer latice (parts per weight) | | |
|---|---|---|
| Non-fluorine containing material | Fluorine containing copolymer latex | Maximum holdout time (hours) |
| 100 | 0.05 | 2.5 |
| 100 | 0.5 | 4.5 |

The average peanut oil holdout time for the non-fluorine containing material alone was 1.4 hours.

Example XIV

A functional seurface coating composition was prepared by blending a fluorine containing copolymer latex, consisting of 90 parts by weight of undecafluorocyclohexane carbinol methacrylate and 10 parts by weight of methacrylic acid, with Dow Latex 620, carboxylated styrene-butadiene latex.

The peanut oil holdout (greased) of the resulting fluoropolymer latice coating applied at 6 to 8 pounds per 3,000 square feet to 50 pound kraft paper and tested at 60° C. is shown in the following table:

| Fluoropolymer latice (parts per weight) | | |
|---|---|---|
| Non-fluorine containing material | Fluorine containing polymer latex | Maximum holdout time (hours) |
| 100 | 0.5 | 3.0 |

The average peanut oil holdout time for the non-fluorine containing material alone was 1.4 hours.

Example XV

A functional surface coating composition is prepared by blending a fluorine-containing polymer latex, consisting of poly(nonadecafluoro-4-(n-butyl)cyclohexane carbinol methacrylate), with Dow 620, carboxylated styrene-butadiene latex.

The peanut oil holdout of the resulting fluoropolymer latice coating applied at 6 to 8 pounds per 3,000 square feet to 50 pound Kraft paper and tested at 60° C. is shown in the following table:

| Fluoropolymer latice (parts per weight) | | |
|---|---|---|
| Non-fluorine containing material | Fluorine containing polymer latex | Average holdout time (hours) |
| 100 | 0.2 | 6.5 |

The average peanut oil holdout time for the non-fluorine containing material alone is 1.4 hours.

Example XVI

A functional surface coating composition is prepared by blending a fluorine containing polymer latex, consisting of poly(1,1,2,2 - tetrahydroheptadecafluorononyl carbinol methylacrylate), with Tylac PCX, carboxylated styrene-butadiene latex.

The peanut oil holdout (creased) of the resulting fluoropolymer latice applied to paper (identical to that described in Example IV) at 60° C. is shown in the following table:

| Fluoropolymer latice (parts per weight) | | |
|---|---|---|
| Non-fluorine containing material | Fluorine containing polymer latex | Average holdout time (hours) |
| 100 | 0.2 | 7.0 |

The average peanut oil holdout time for the non-fluorine containing material alone was 4.0 hours.

Example XVII

To 100 active p.b.w. of CSB (Dow Latex 620) 0.5 active p.b.w. of poly-(6-hydrododecafluorohexane carbinol acrylate) (6HDA) is added. Similarly, to 100 active p.b.w. of Dow Latex 620, 0.5 active p.b.w. of the copolymer latex 6-hydrododecafluorohexane carbinol acrylate/methacrylic acid (6HDA/MAA) in the weight ratio of 90/10 is added.

These functional surface coating compositions are coated on 50 pounds/ream of southern kraft and tested as in Example IV with the following results:

| | Peanut oil holdout of creased specimens at 60° C., hours (avg.) |
|---|---|
| CSB (100 p.b.w.) | 1.4 |
| CSB (100 p.b.w.)/6HDA/MAA (0.5 p.b.w.) | 3.0 |
| CSB (100 p.b.w.)/6HDA (0.5 p.b.w.) | 3.0 |

These results show the improved oil resistance of CSB coatings containing either one of the following fluorochemicals:

6HDA/MAA

6HDA

Example XVIII

A functional surface coating composition is prepared by blending a fluorine containing copolymer latex, consisting of 90 parts by weight of heptadecafluorooctyl (N-ethyl) sulfonamide-2-ethyl acrylate and 10 parts by weight of methacrylic acid, with Dow Latex 620, carboxylated styrene-butadiene latex.

The peanut oil holdout (creased) of the resulting fluoropolymer latice coating applied at 6 to 8 pounds per 3,000 square feet to 50 pound kraft paper and tested at 60° C. is shown in the following table:

| Fluoropolymer latice (parts per weight) | | |
|---|---|---|
| Non-fluorine containing material | Fluorine containing copolymer latex | Maximum holdout time (hours) |
| 100 | 0.3 | 3.0 |

The average peanut oil holdout time for the non-fluorine containing material alone was 1.4 hours.

Example XIX

A functional surface coating composition is prepared by blending a fluorine containing polymer latex, consisting of poly(bis-trifluoromethyl carbinol acrylate) with Tylac PCX, carboxylated styrene-butadiene latex.

The peanut oil holdout (creased) of the resulting fluoropolymer latice applied to paper (identical to that of Example IV) at 60° C. is shown in the following table:

| Fluoropolymer latice (parts per weight) | | |
|---|---|---|
| Non-fluorine containing material | Fluorine containing copolymer latex | Maximum holdout time (hours) |
| 100 | 0.25 | 6.0 |

The average peanut oil holdout time for the non-fluorine containing material alone was 4.0 hours.

From the foregoing it will be seen that this invention is well adapted to obtain all of the ends and objects hereinabove set forth, together with other advantages which are obvious and which are inherent to the system.

As can be seen, the functional surface coating compositions of this invention provide paper coatings which are superior to the natural and synthetic polymers typically employed as converting chemicals. The functional surface coating compositions can be used as either on-machine or off-machine coatings. Moreover, an unexpected, and synergistic effect is obtained when urea-formaldehyde is added to the functional surface coating compositions of this invention.

Because of the inherent polymeric properties of the functional surface coating compositions of this invention, the coatings are useful not only in letterpress printing techniques but also in offset printing. The compositions are also utilizable in size press or machine operations coating.

Obviously, many modifications and variations of the invention as hereinbefore set forth can be made without departing from the spirit and scope thereof and therefore, only such limitations should be imposed as are indicated in the appended claims.

We claim:

1. A functional surface coating composition comprising an aminoplast resin in a blend comprising (1) 0.05 to 10% by weight of a fluorine-containing polymer and (2) 90 to 99.95% by weight of a carboxylated styrene-butadiene copolymer latex with carboxylation approximately ranging from about 0.1% to about 12% by weight based on the weight of the latex the aminoplast resin being employed in an amount sufficient to crosslink the carboxyl groups of the carboxylated styrene-butadiene copolymer to a surface, wherein the fluorine-containing polymer is selected from the group consisting essentially of:

(a) homopolymers of fluorocarbon acrylic monomers having 2 to 18 carbon atoms in the alkyl, isoalkyl or cycloalkyl group and at least one perfluoroalkyl or two perfluoroalkylene groups; and (b) copolymers of a fluorocarbon acrylic monomer and an alpha, beta-ethylenically unsaturated carboxylic acid monomer having the structure:

$$CHR_5(R_6)COOH$$

where $R_5$ is H, $CH_3$, $C_6H_5$ or COOH and $R_6$ is H, $CH_3$ or $CH_2COOH$.

2. The composition of claim 1 wherein the aminoplast resin is urea-formaldehyde.

3. The composition of claim 1 wherein the fluorine-containing polymer is a homopolymer of undecafluorocyclohexane carbinol acrylate.

4. The composition of claim 1 wherein the fluorine-containing polymer is a homopolymer of undecafluorocyclohexane carbinol methacrylate.

5. The composition of claim 1 wherein the fluorine-containing polymer is a copolymer of undecafluorocyclohexane carbinol acrylate and acrylic acid.

6. The composition of claim 1 wherein the fluorine-containing polymer is a copolymer of undecafluorocyclohexane carbinol acrylate and methacrylic acid.

7. The composition of claim 1 wherein the fluorine-containing polymer is a copolymer of undecafluorocyclohexane carbinol methacrylate and methacrylic acid.

8. The composition of claim 1 wherein the fluorine-containing polymer is a copolymer of heptafluoropropyl carbinol acrylate and acrylic acid.

9. The composition of claim 1 wherein the fluorine-containing polymer is a homopolymer of nonadecafluoro-4-(n-butyl) cyclohexane carbinol methacrylate.

10. The composition of claim 1 wherein the fluorine-containing polymer is a homopolymer of 1,1,2,2-tetrahydroheptadecafluorononyl carbinol methacrylate.

11. The composition of claim 1 wherein the fluorine-containing polymer is a homopolymer of 6-hydrododecafluorohexane carbinol acrylate.

12. The composition of claim 1 wherein the fluorine-containing polymer is a copolymer of heptadecafluorooctyl (n-ethyl) sulfonamido-2-ethyl acrylate and methacrylic acid.

13. The composition of claim 1 wherein the fluorine-containing polymer is a homopolymer of bis-trifluoromethyl carbinol acrylate.

14. The composition of claim 1 wherein the fluorine-containing polymer is a homopolymer of pentadecafluoroheptyl carbinol acrylate.

15. The composition of claim 1 wherein the aminoplast resin is employed in an amount ranging from about 1% to about 50% on 100 parts by weight of basic coating composition.

16. The composition of claim 1 wherein the aminoplast resin is employed in an amount ranging from about 5% to about 25% on 100 parts by weight of basic coating composition.

17. The composition of claim 1 wherein carboxylation of the styrene-butadiene copolymer latex is in the range from about 0.2 to about 5.0% by weight based upon the weight of the latex.

18. The composition of claim 1 wherein the fluorine containing polymer is a homopolymer of a fluorocarbon acrylic monomer having 2 to 18 carbon atoms in the alkyl, isoalkyl or cycloalkyl group and at least one perfluoroalkyl or two perfluoroalkylene groups.

19. The composition of claim 1 wherein the fluorine containing polymer is a copolymer of a fluorocarbon acrylic monomer and an alpha, beta-ethylenically unsaturated carboxylic acid monomer having the structure:

$$CR_5(R_6)COOH$$

where $R_5$ is H, $CH_3$, $C_6H_5$ or COOH and $R_6$ is H, $CH_3$ or $CH_2COOH$.

References Cited

UNITED STATES PATENTS

| | | | |
|---|---|---|---|
| 3,592,686 | 7/1971 | Barber | 117—161 |
| 3,503,915 | 3/1970 | Peterson | 260—850 |
| 3,532,659 | 10/1970 | Hager et al. | 117—155 |
| 3,637,614 | 1/1972 | Greenwood | 260—853 |

JOHN C. BLEUTGE, Primary Examiner

U.S. Cl. X.R.

117—155 UA, 161 UB; 260—15, 17 R, 852, 853, 890, 897 C, 900